Oct. 10, 1961

A. BECHLER 3,003,166

AUTOMATIC LATHE WITH PLURAL TOOL SPINDLES AND
MEANS TO CHANGE TOOL SPINDLE SPEED TO
EFFECTUATE REVERSAL FOR THREADING

Filed Aug. 12, 1958

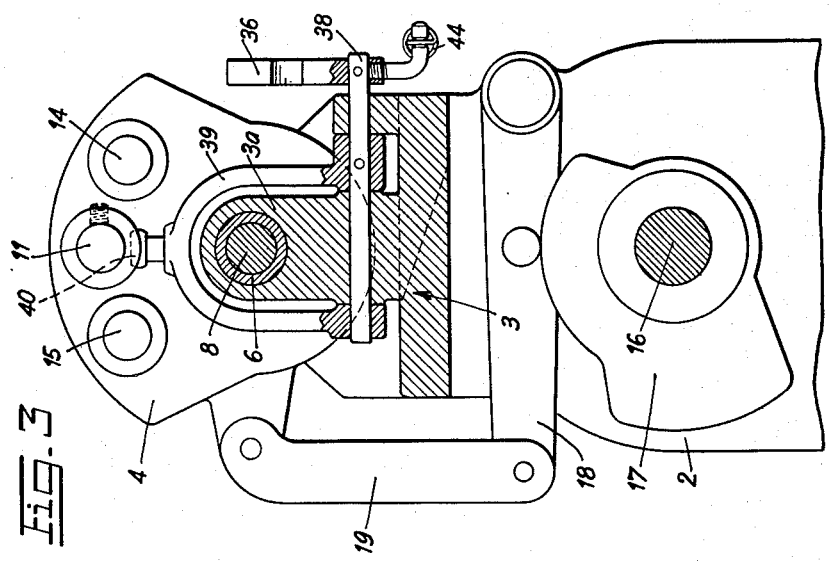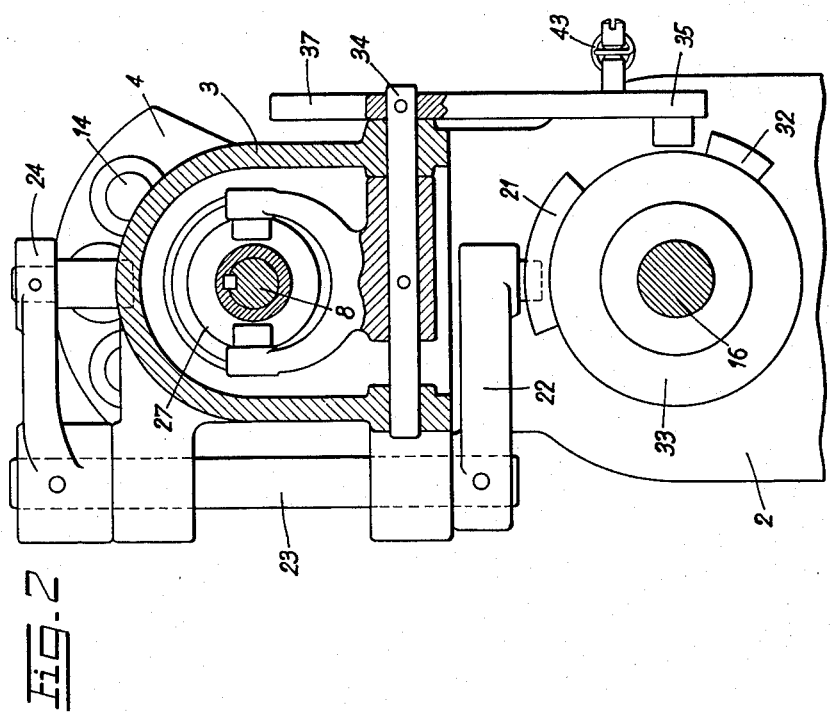

3,003,166
AUTOMATIC LATHE WITH PLURAL TOOL SPIN-
DLES AND MEANS TO CHANGE TOOL SPINDLE
SPEED TO EFFECTUATE REVERSAL FOR
THREADING
André Bechler, 150 Nassau St., Moutier 38, Switzerland
Filed Aug. 12, 1958, Ser. No. 754,622
Claims priority, application Switzerland Apr. 9, 1958
2 Claims. (Cl. 10—136)

The present invention relates to an automatic lathe and more particularly to an automatic lathe equipped with a device for drilling and screw-cutting.

In a lathe of this type it is sometimes necessary to provide a mechanism to rotate the spindle at two different speeds as well as a device by means of which the desired speed is selected and sustained until the other speed is required.

In ordinary automatic lathes of this sort, most parts of the selecting mechanism and of the mechanisms for releasing the same are arranged at the rear of the working spindle and occupy space that is urgently needed for other purposes.

It is an object of the present invention to provide an automatic lathe which utilizes, by means of a new construction, the narrow space below the rear of the working spindle for the selecting and releasing mechanisms in order to free the space above it.

The automatic lathe according to one embodiment of the present invention is characterized by the fact that the selecting device, located below the working spindle, has a spring-operated clutch lever to place the working spindle in drive connection with one of two drive mechanisms and a ratchet to hold the clutch lever in said position. A shackle-like part extends transversely beneath the spindle and carries a projection which is engaged by a longitudinally adjustable ring positioned on the rear of the spindle in order to disconnect the locking ratchet as soon as the feed of such spindle is nearly concluded. This disconnecting of the ratchet permits a return spring to swing the clutch lever into connection with the other drive mechanism.

The attached drawing represents a preferred embodiment of the present invention in detail sufficient to explain the invention.

FIGS. 2 and 3 are cross-sections along the lines II—II and III—III of FIG. 1, respectively.

Figure 1:
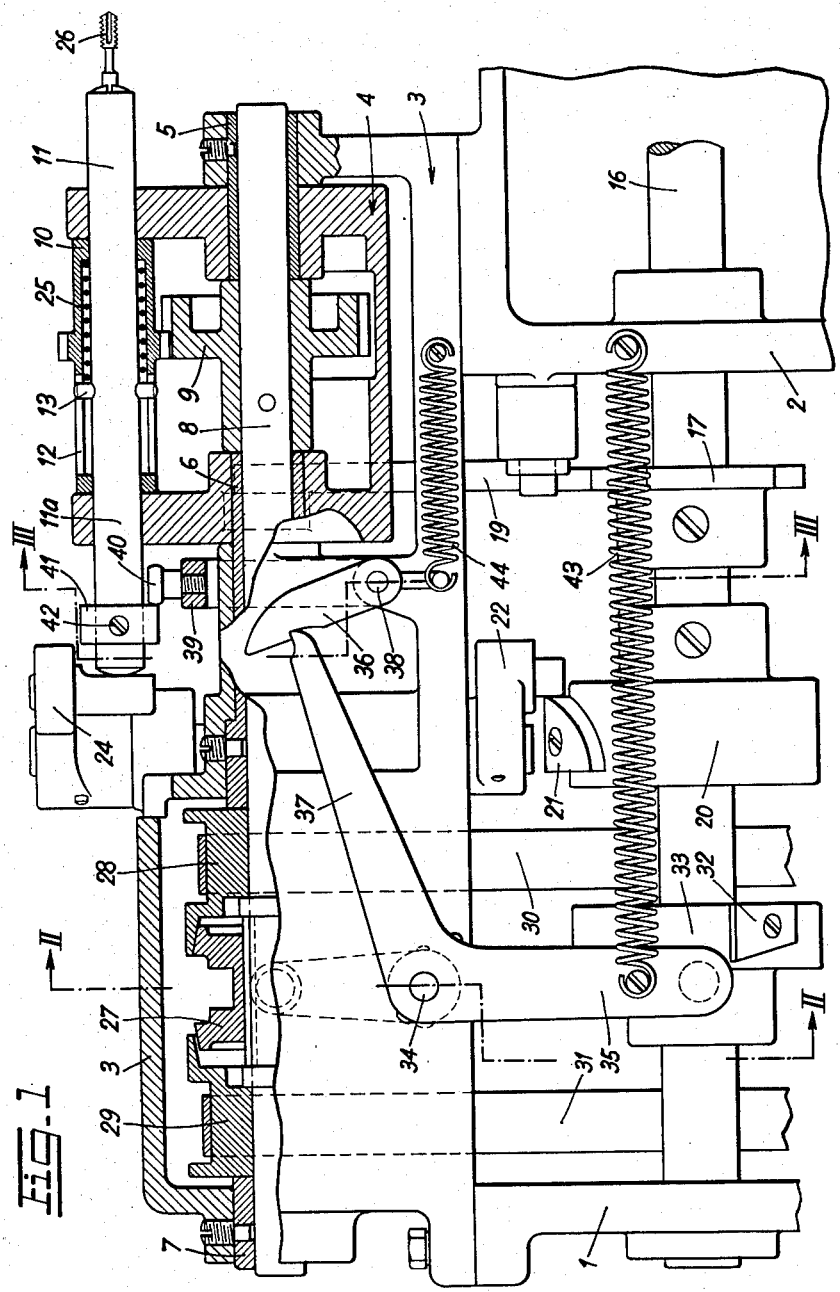
FIG. 1 is a longitudinal section of the embodiments.

The automatic lathe shown by way of example in the drawing has bed portions 1 and 2 on which is fixed a bearing support 3, the front half of which is positioned adjacent the headstock (not shown). The bearing support 3 carries a rotatable spindle head 4 of a drilling and screw-cutting mechanism. The two cheeks of the spindle head rest on bearing bushings 5 and 6 which are fixed in the bearing support 3 and together with a bushing 7 serve as supports for a transmission shaft 8. Upon the latter, between the cheeks of the spindle head 4, is fixed a gear wheel 9 which meshes with the gear of a carrier sleeve 10. A working spindle 11 extends slidably through the carrier sleeve 10 which is arranged between the cheeks of the spindle head 4, and is provided with longitudinal slots 12 in which is engaged a transverse pin 13 fixed to the working spindle in such a way that it causes the working spindle to turn with it but allows a limited longitudinal movement of said spindle. In the rotatable spindle head 4, at the same distance from the axis of rotation as the working spindle 11, are working spindles 14 and 15 which are either secured against rotation or, in like manner as working spindle 11, may be in drive connection with the gear wheel 9.

In the bed parts 1 and 2 is a continuously revolving drive shaft 16 which along with cam plate 17, lever 18, and connecting rod 19, comprises a well-known mechanism to move the spindle head 4 successively into positions in which one or the other of the working spindles 11, 14, or 15 is in the working position; that is to say, in which its axis coincides with the axis of the main spindle of the headstock.

The drive shaft 16 is likewise provided with a rotating part 20 which, by means of a cam 21 releasably attached to it and lever parts 22, 23 and 24 resting on the bearing support 3, moves the working spindle 11, 14 and 15 forward when it is in a working position. The return of this working spindle is effected by means of a spring 25.

As is well-known, the rotation of the working spindle 11, provided for instance with a tap drill 26 and, if need be, the rotation of the other rotatable working spindles, during a cutting operation must proceed with a different speed in feeding than in returning. It has been found satisfactory to effect the change in speeds in the one case before the start of the feeding from the drive shaft 16, and in the other case by means of the movement of the working spindle at the end of the feeding. The aforementioned starting and driving operation is performed as follows:

A clutch member 27, which is mounted on the transmission shaft 8 in such a manner that it will turn with such shaft and may be displaced longitudinally thereon, in a well-known manner, produces a frictional driving connection with one or the other of two pulleys 28 and 29 arranged for free rotation on the transmission shaft 8 but which are axially not displaceable. These pulleys are driven by means of belts 30 and 31, through a well-known mechanism (not shown), at different speeds suitable for the purpose indicated. Just before the start of the feeding of the working spindle in the working position by means of the driving mechanism 20–24, the transmission shaft 8 (which is constantly in driving connection with the rotating working spindles) is connected with the pulley 28 by means of a cam such as 32 which is releasably secured on a rotary part 33 fixed to the drive shaft 16. This cam activates arm 35 of a clutch lever placed with its axis 34 in the bearing support 3 in order to move the clutch lever in a clockwise direction (FIG. 1) against the pull of a return spring 43 secured to arm 35. This not only produces a frictional driving connection between the parts 27 and 28, but due to a spring 44, a ratchet 36 snaps over the free end of arm 37 of the clutch lever in order to hold the latter in its working position. The ratchet 36 forms part of a lever unit whose axis 38, extending in a transverse direction, rests in the bearing support 3, connecting the ratchet 36 rigidly with a shackle-like part 39. As may be seen from FIG. 3, the central, semi-circular section of this part 39 extends between the semi-cylindrical part 3a of the bearing support 3 serving as a bearing body, and the rear ends of the working spindles 11, 14, and 15 protruding from the spindle head 4. The top of part 39, which is positioned directly under the working spindle in the working position (the spindle 11 in the operational position shown), is provided with a projection 40 that is in threaded engagement therewith. On the rear 11a of the working spindle 11 a check ring 41 is fixed by means of a screw 42; the check ring being longitudinally adjustable after loosening the screw 42. The check ring 41 is adjusted on the working spindle in such a position that when the feeding of this working spindle is almost concluded, it will push against the projection 40 thereby releasing the ratchet 36 from the arm 37 of the clutch lever. The clutch lever is then swung, by means of return spring 43, in a counterclockwise direction (FIG. 1) releasing clutch member 27 from the pulley 28 whereby a frictional driving connection is immediately effected between said coupling part and the pulley 29. The spring 43 maintains the clutch member 27 in driving connection with the pulley 28 until it is again swung in clockwise direction by the cam 32.

It may be seen then, that the space above the rear of the working spindles is left free and may be utilized in some other way.

It is, of course, understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

What I claim and desire to secure by Letters Patent is:

1. An automatic lathe comprising a plurality of working spindles, a single swivel support carrying said plurality of spindles at uniform distances from the rotational axis of said support, said spindles being longitudinally displaceable and at least one of said plurality of spindles being rotatable, a drive shaft, means including a cam disc secured on said drive shaft to swing said swivel support for selectively placing a working spindle in working position, means comprising a second cam resting on the drive shaft for feeding the working spindle placed in working position, a transmission shaft in driving connection with said working spindle, two spaced-apart drive members freely rotatable on said transmission shaft and adapted to have differential speeds, a coupling member rigidly connected with the transmission shaft and disposed between said drive members whereby upon longitudinal displacement it may be selectively placed in frictional engagement with said drive members, a clutch lever connected to displace the coupling member, a return spring acting on the clutch lever normally urging the coupling member against one of said two drive members, a cam resting on the drive shaft effective at the beginning of the feeding movement of the working spindle to swing the clutch lever against the action of the return spring to connect the coupling member to the other of said drive members, locking means for temporarily locking the clutch lever after engagement of said coupling member with said other drive member, said locking means comprising a spring-loaded lever member, a pawl on said lever member positioned to engage said clutch lever when swung against the resistance of said return spring, and a shackle-like member carried by said lever member and extending in a transverse plane between the transmission shaft and the rear end portion of the working spindle, said shackle-like member having a projection disposed below the working spindle in its working position, and said working spindles each carrying a ring adjustable longitudinally thereon and positioned to engage with said projection when the working spindle in working position reaches a predetermined position, said engagement and continued movement of said working spindle being effective to release said clutch lever by movement of said lever member through said shackle member whereby said clutch lever is adapted to be released when the feed of the working spindle in working position has reached a predetermined extent.

2. An automatic lathe comprising at least one rotatable working spindle, a single swivel support carrying said spindle spaced from the rotational axis of said support, said spindle being longitudinally displaceable, a drive shaft, means including a cam disc secured on said drive shaft to swing said swivel support for placing said working spindle in working position, means comprising a second cam resting on the drive shaft for feeding the working spindle placed in working position, a transmission shaft in driving connection with said working spindle, two spaced-apart drive members freely rotatable on said transmission shaft and adapted to have differential speeds, a coupling member rigidly connected with the transmission shaft and disposed between said drive members whereby upon longitudinal displacement it may be selectively placed in frictional engagement with said drive members, a clutch lever connected to displace the coupling member, a return spring acting on the clutch lever normally urging the coupling member against one of said two drive members, a cam resting on the drive shaft effective at the beginning of the feeding movement of the working spindle to swing the clutch lever against the action of the return spring to connect the coupling member to the other of said drive members, locking means for temporarily locking the clutch lever after engagement of said coupling member with said other drive member, said locking means comprising a spring-loaded lever member, a pawl on said lever member positioned to engage said clutch lever when swung against the resistance of said return spring, and a shackle-like member carried by said lever member and extending in a transverse plane between the transmission shaft and the rear end portion of the working spindle, said shackle-like member having a projection disposed below the working spindle in its working position, and said working spindle carrying a ring adjustable longitudinally thereon and positioned to engage with said projection when the working spindle in working position reaches a predetermined position, said engagement and continued movement of said working spindle being effective to release said clutch lever by movement of said lever member through said shackle member whereby said clutch lever is adapted to be released when the feed of the working spindle in working position has reached a predetermined extent.

References Cited in the file of this patent

UNITED STATES PATENTS

| | | |
|---|---|---|
| 1,805,998 | Schaerer | May 19, 1931 |
| 1,810,227 | Shea | June 16, 1931 |
| 2,179,744 | Junghans | Nov. 14, 1939 |
| 2,619,711 | Beachler | Dec. 2, 1952 |

FOREIGN PATENTS

| | | |
|---|---|---|
| 335,262 | Germany | Mar. 29, 1921 |